(12) United States Patent
Kellum

(10) Patent No.: US 8,726,774 B1
(45) Date of Patent: May 20, 2014

(54) MITER SAW DUST COLLECTOR APPARATUS

(76) Inventor: David Kellum, Port Townsend, WA (US)

( * ) Notice: Subject to any disclaimer, the term of this patent is extended or adjusted under 35 U.S.C. 154(b) by 129 days.

(21) Appl. No.: 13/429,763

(22) Filed: Mar. 26, 2012

(51) Int. Cl.
  *B26D 7/00* (2006.01)
  *B26D 7/06* (2006.01)

(52) U.S. Cl.
  USPC .................................. 83/100; 83/167; 83/581

(58) Field of Classification Search
  USPC .......... 83/100, 581, 167; 144/252.1; 15/257.1
  See application file for complete search history.

(56) References Cited

U.S. PATENT DOCUMENTS

| | | | |
|---|---|---|---|
| 3,945,281 A | 3/1976 | Kreitz | |
| 3,958,474 A | 5/1976 | Kreitz | |
| 4,367,665 A | 1/1983 | Terpstra et al. | |
| 5,931,072 A | 8/1999 | Shibata | |
| 6,183,527 B1 | 2/2001 | O'Banion et al. | |
| 6,470,778 B1 | 10/2002 | Kaye, Jr. et al. | |
| 6,783,563 B1 | 8/2004 | Eckhoff et al. | |
| 6,960,124 B2 * | 11/2005 | Lee | 451/456 |
| 7,040,239 B2 | 5/2006 | Shelton et al. | |
| 7,216,572 B2 | 5/2007 | Keenan | |
| 7,222,560 B2 | 5/2007 | Parks et al. | |
| 7,455,091 B2 * | 11/2008 | Thackery et al. | 144/373 |
| 7,559,268 B2 | 7/2009 | Sasaki et al. | |
| 7,654,181 B2 | 2/2010 | Quinlan | |
| 7,763,091 B1 | 7/2010 | Nunke | |
| 7,882,771 B2 | 2/2011 | Sasaki et al. | |
| 7,980,163 B2 | 7/2011 | Meredith et al. | |
| 2010/0089210 A1 * | 4/2010 | Lanciaux | 83/39 |
| 2012/0090439 A1 * | 4/2012 | Butler | 83/68 |
| 2012/0247294 A1 * | 10/2012 | Martin | 83/100 |
| 2013/0220092 A1 * | 8/2013 | Keenan | 83/100 |

\* cited by examiner

*Primary Examiner* — Omar Flores Sanchez

(74) *Attorney, Agent, or Firm* — Virginia P. Shogren, Esq.

(57) ABSTRACT

A downdraft enclosure and curved shroud forming a 180 degree catch area for dust and debris created by miter saw operation in at any angle or position. The enclosure defines a downdraft space. Exhaust opening perforations are formed on the top of the enclosure, with a dust outlet opening formed in the base of the enclosure. A flexible hose from the saw housing to the downdraft space captures debris ejected in an upward direction; the shroud, top of the enclosure, and miter saw fence capture dust ejected in outward, side and downward directions. A hose may be installed on the dust outlet to continuously carry the debris directly to a vacuum, thereby continuously keeping a workspace clear of debris ejected in all directions regardless of the saw's cut angle or position.

20 Claims, 4 Drawing Sheets

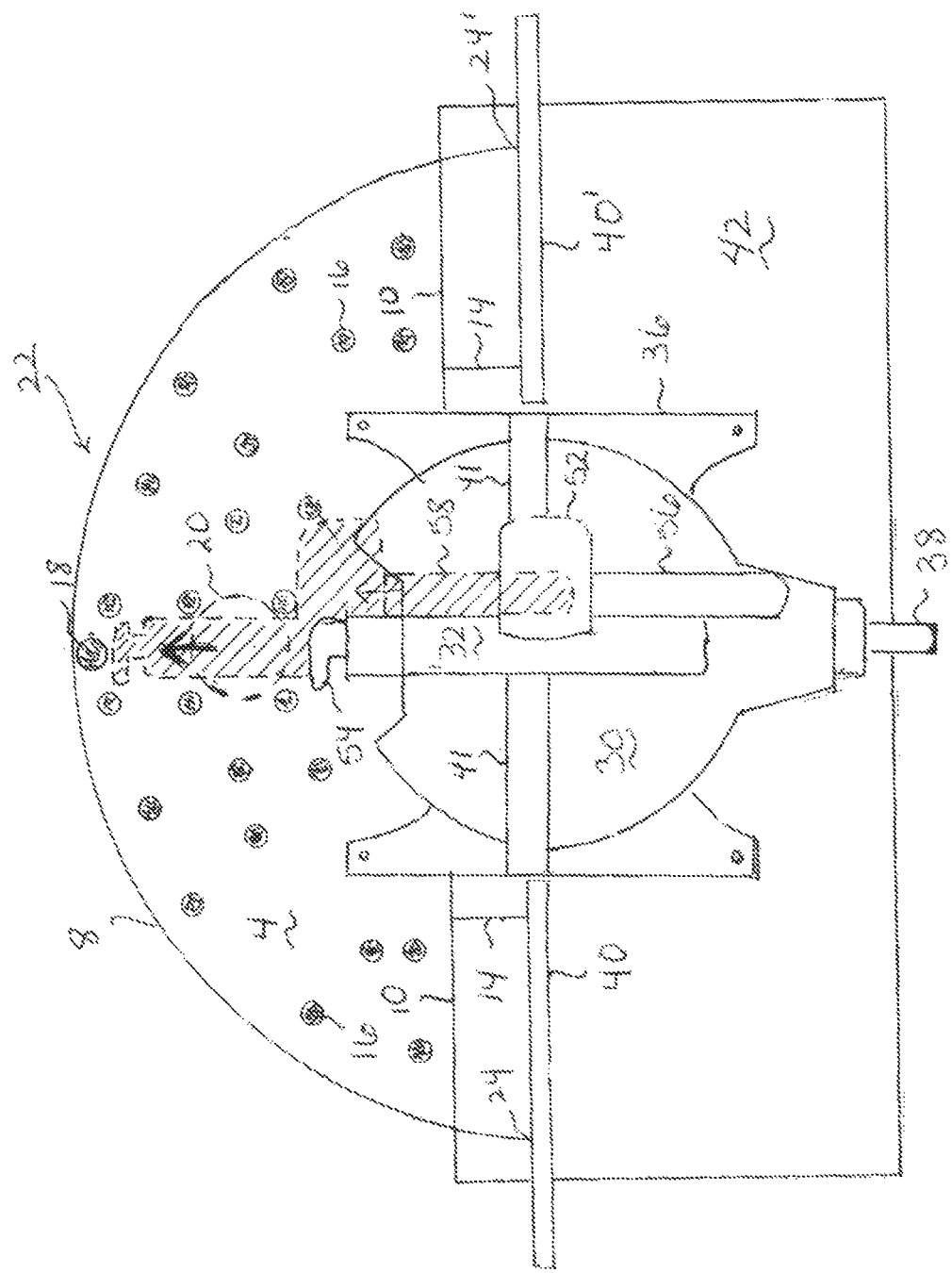

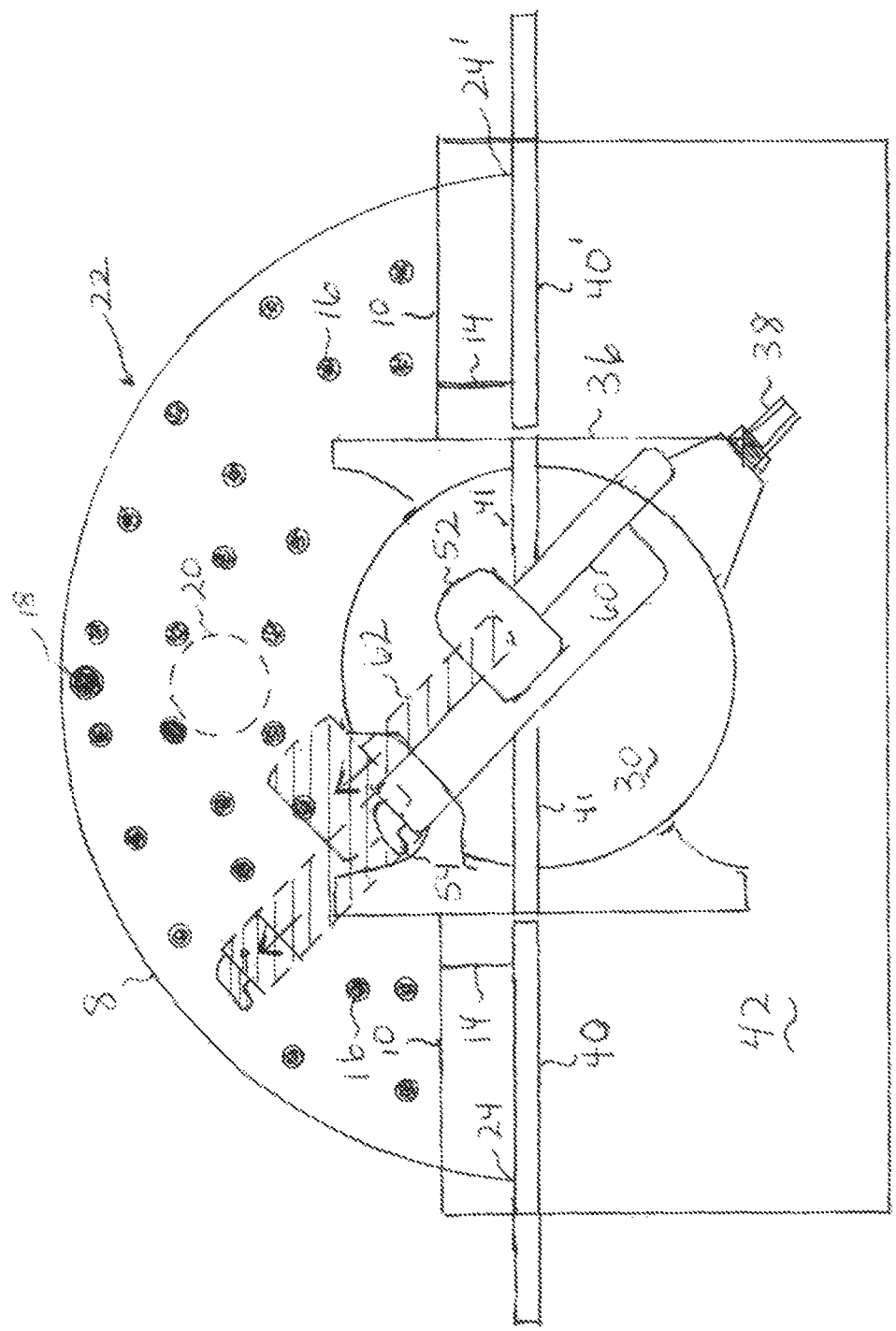

MITER SAW DUST COLLECTOR APPARATUS

FIELD OF THE INVENTION

This invention relates generally to dust shrouds for tools, and more particularly to a comprehensive dust collector apparatus for a sliding miter saw that collects dust across multiple blade axes without requiring movement of the dust collector, and collects not only debris propelled towards the floor or wall behind the saw table, but also the stream of material being ejected from the saw blade housing itself.

BACKGROUND OF THE INVENTION

Miter saws are ubiquitous in woodshops, schools, construction sites and manufacturing facilities of all kinds. Miter saws must be able to move through multiple axes and also be able to slide forward to execute cuts. Miter saw cutting positions are routinely changed by a user several times each few minutes. The saw movements and the different axes of cuts necessitate a relatively large working area in which broadly ejected saw dust and debris quickly accumulate. Considerable amounts of debris are generated by a miter saw in a very short time period.

Saw dust contains any number of contaminants and allergens, many of which are toxic to humans and animals. The debris should be kept from a workplace environment for a number of health, safety and cleanliness reasons.

While most machines in a workplace have good containment and collection systems, miter saws are conspicuously underserved in that way. Previous attempts to provide containment are far from effective. Most saw manufacturers provide limited means of containment, most often relying on a small dust collection bag attached to the saw blade housing. The bags fill up in mere minutes and are often removed by users as a result. Even when in use, the bags are inadequate to collect the substantial dust and debris generated by the rotating movement of the saw blade which fans the material in all directions, including directly into the user's face. Some attempts to provide a universal device have had limited success, but none offer a complete solution. For example, some shroud devices are positioned behind the saw to provide partial collection but need to be repositioned as the saw travels through different cutting axes. The requirement to stop work and reposition the shroud interferes with work progress and renders these devices impractical.

Other prior art dust collector devices comprise a large canvas shroud to ostensibly cover the saw and table to enable a collection of debris into a bag under the table. These tent-type devices obscure the available light around the saw area and do nothing to keep dust out of the air around the saw operator or others in the work area.

Accordingly, there is an urgent but as of yet unmet need in the art for a miter saw dust collector apparatus that: 1) collects debris across multiple saw movements and cutting axes; 2) reduces air-borne saw dust contaminants to safe levels; 3) does not require a user to frequently stop work to empty out bags or small containers attached to the saw blade housing; 4) does not require repositioning for different cutting axes; and, 5) does not obscure light from reaching the saw.

THE INVENTION

Summary of the Invention

The inventive Miter Saw Dust Collector Apparatus comprises a downdraft enclosure having a top surface, a bottom surface, a curved margin defining an outer circumference, and a straight margin defining an inner diameter. The top and bottom surfaces and the curved and straight margins of the enclosure define an internal downdraft space. An attachment tab extends laterally from the top surface of the enclosure proximate the inner diameter. The tab has a defined width. A plurality of spaced exhaust openings are formed in the top surface of the enclosure. A hose receptacle opening is formed in the top surface of the enclosure proximate the outer circumference. A length of flexible hose has an end capable of attachment to the hose receptacle opening on the top surface of the enclosure. A dust outlet opening is formed in the bottom surface of the enclosure. A shroud panel extends vertically from the top surface at the outer circumference. The shroud has opposing edge margins overhanging the inner diameter of the enclosure by an overhang length generally consistent with the tab width.

The apparatus may further comprise a length of exhaust hose, an end of the hose capable of attachment to the dust outlet proximate the enclosure's bottom surface. The exhaust hose extends beneath the bottom surface of the enclosure to a dust extractor (vacuum).

In operation, the dust extractor generates a vacuum force that pulls on a plurality of debris particles formed by the miter saw cutting wood or other objects. The force transports the particles generally from the top surface, through the downdraft space, through the dust outlet, through the exhaust hose and into the dust extractor.

A plurality of debris particles formed by operation of a miter saw ejected in a generally upward direction relative to a saw blade housing for the saw are collected in the flexible hose, transported into the downdraft space, through the dust outlet, and to the dust extractor. A plurality of debris particles formed by operation of the miter saw ejected in a generally downward direction are collected on the top surface of the enclosure, and are transported through the exhaust openings into the downdraft space, through the dust outlet, and to the dust extractor. A plurality of debris particles formed by operation of the miter saw ejected in a generally forward direction contact the shroud, fall to the top surface of the enclosure, are transported through the exhaust openings into the downdraft space, through the dust outlet, and to the dust extractor.

As a result, a workspace surrounding the apparatus is continuously kept clear of a plurality of debris particles formed by operation of the miter saw and ejected in all directions regardless of the saw's cut angle or position.

BRIEF DESCRIPTION OF THE DRAWINGS

The invention is described in more detail with reference to the attached drawings, in which:

FIG. 3 is a top view diagram of the dust collector apparatus installed on a work bench with miter saw in two positions for a 90 degree cut; and, FIG. 4 is a top view diagram of the dust collector apparatus installed on a work bench with miter saw in two positions for a 45 degree cut.

DETAILED DESCRIPTION OF THE ILLUSTRATIVE EMBODIMENT

The following detailed description illustrates the invention by way of example, not by way of limitation of the scope, equivalents or principles of the invention. This description will clearly enable one skilled in the art to make and use the invention, and describes several embodiments, adaptations, variations, alternatives and uses of the invention.

In this regard, the invention is illustrated in the several figures, and is of sufficient complexity that the many parts, interrelationships, and sub-combinations thereof simply cannot be fully illustrated in a single patent-type drawing. For clarity and conciseness, several of the diagrams show in schematic, or omit, parts that are not essential in that diagram to a description of a particular feature, aspect or principle of the invention being disclosed. Thus, the best mode embodiment of one feature may be shown in one diagram, and the best mode of another feature will be called out in another diagram.

Miter Saw Dust Collector Apparatus

In general terms, the Miter Saw Dust Collector Apparatus comprises a perforated enclosure with a shroud panel extending vertically there from. The enclosure is installed flush against a work bench with the opposing edges of the shroud overhanging the enclosure and in contact with a fence for the miter saw. The apparatus is used in conjunction with a flexible hose taking debris from the top of the blade housing directly into the enclosure via a hose receptacle on the top surface of the enclosure. A second hose may be attached to the exhaust opening on the bottom surface of the enclosure. The second hose routes the debris to a dust extractor (vacuum machine).

The device collects not only debris that would be propelled to the floor or wall behind the saw table during the cutting process, but also the stream of material being ejected from the saw blade housing. Any debris propelled backward from the cut and not exiting the blade housing is sucked down through the perforated collection platform and continues through the downdraft collection enclosure to a central dust collection system, dedicated dust extractor or vacuum by way of the exhaust hose.

The device confines and removes sawdust and cutting debris from a variety of fixed and sliding electric miter saws that are used primarily for cutting wood products, plastics, some metals and cementitious materials.

The device may be used in conjunction with any height of work bench or table and a number of types of miter saws regardless of brand, and, as such, is virtually universal in application.

The apparatus completely removes dust and debris particles from the saw table and prevents particles from becoming airborne and thus contaminating the ambient air. Complete removal of airborne debris protects both the saw operator and any other persons in the work environment from the dust contaminants.

Figure 1:
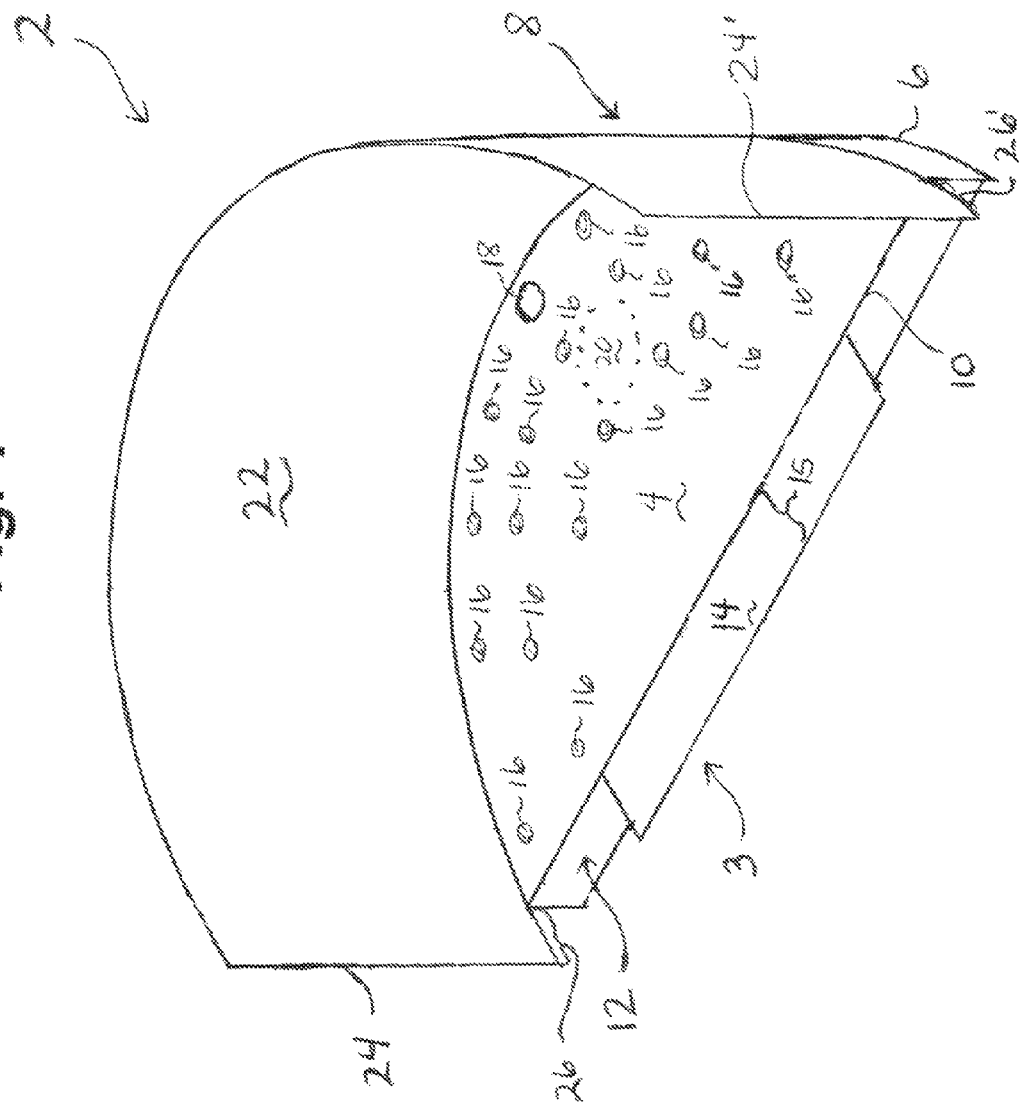
FIG. 1 is a perspective view diagram of the dust collector apparatus, according to the invention.

FIG. 1 shows a perspective view of the dust collector apparatus 2, according to the invention. Referring to FIG. 1, the apparatus 2 comprises a semi-circular downdraft enclosure 3. The enclosure 3 has a top surface 4, a bottom surface 6, a curved margin defining an outer circumference 8 and a straight margin defining an inner diameter 10. The top and bottom surfaces 4/6 and the curved and straight margins 8/10 of the enclosure 3 define an internal downdraft space 12.

Referring to FIG. 1, an attachment tab 14 extends laterally from the top surface 4 of the enclosure 3 proximate the inner diameter 10. The tab 14 has a defined width 15. A plurality of spaced exhaust openings 16 are formed in the top surface 4 of the enclosure 3.

Referring to FIG. 1, a hose receptacle opening 18 is formed in the top surface 4 of the enclosure 3 proximate the outer circumference 8. A dust outlet opening 20 is formed in the bottom surface 6. While the shapes of the exhaust openings 16, hose receptacle opening 18 and dust outlet opening 20 shown in FIG. 1 are circular, it should be understood that any suitable or desired shapes of exhaust openings 16, hose receptacle 18 and/or dust outlet 20 may be utilized in the present invention, including without limitation, elliptical, square, rectangular or rhomboid.

Referring to FIG. 1, a cylindrical semi-circular shroud panel 22 extends vertically from the top surface 4 at the outer circumference 8. The shroud 22 has opposing edge margins 24/24' overhanging the inner diameter 10 of the enclosure 3 by an overhang length 26/26' generally consistent with the tab width 15.

Figure 2:
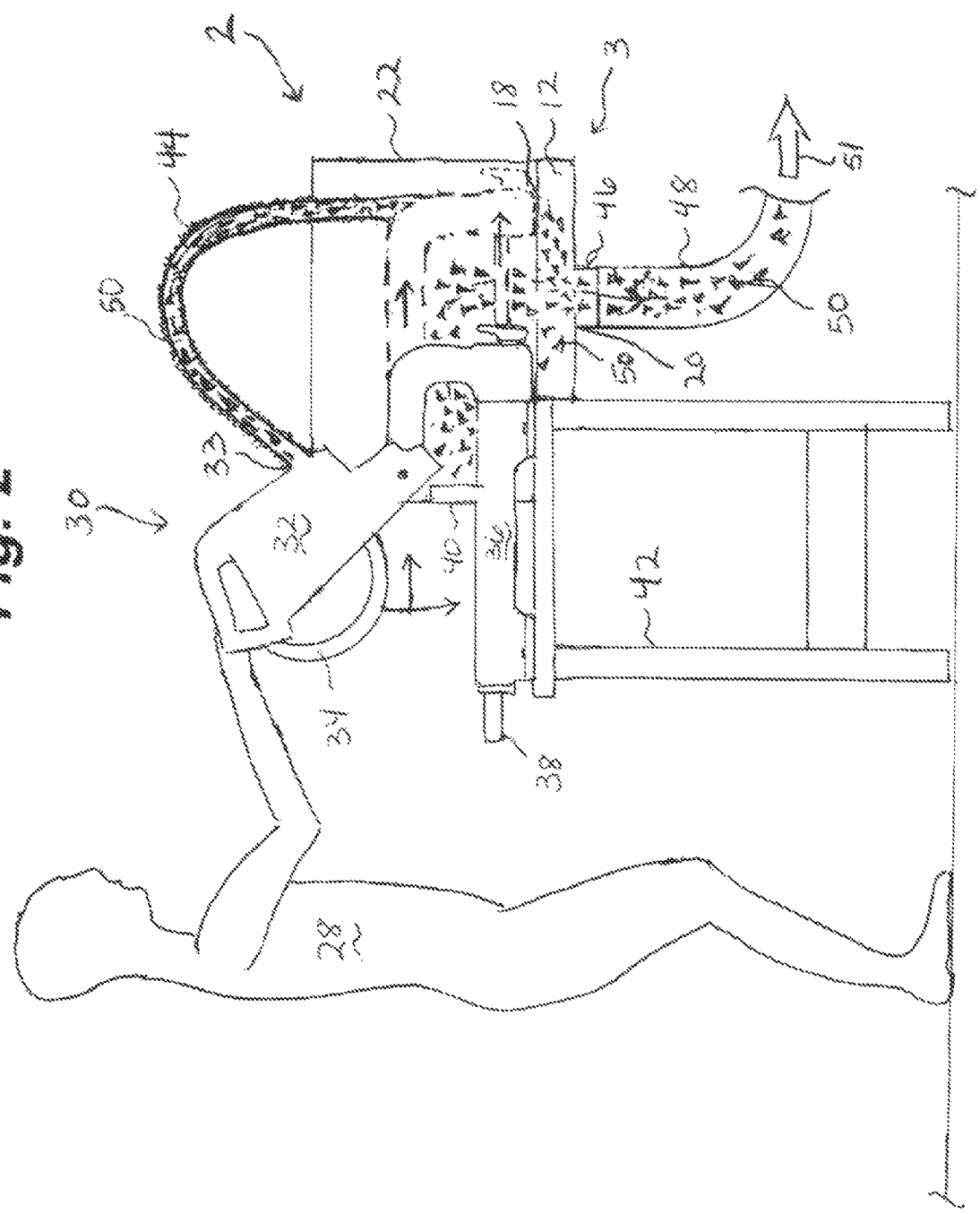
FIG. 2 is a cross-sectional side plan view diagram of a user standing behind a work bench with miter saw in operation and dust collector apparatus collecting dust particles from multiple directions.

Referring to FIG. 1, the semi-circular shape of the enclosure 3 and shroud 22 assist in collection of dust and other debris regardless of the position of the miter saw by blocking and catching debris across a full 180 degree angle (shown further in regard to FIGS. 2-4, infra). The plurality of exhaust openings 16 in the top surface 4 further provide for dust and debris collection regardless of miter saw position and across a full 180 degree angle. While FIG. 1 shows a semi-circular enclosure 3 and corresponding shroud 22, it should be understood that any suitable or desired shape of enclosure 3 and shroud 22 may be utilized with the present invention, including without limitation, an enclosure that is curved proximate the outer circumference 8, with opposing non-curved (straight) side arms, and a corresponding shroud 22 shaped in a curve with straight side arms. It also should be understood that whereas the top surface 4 of FIG. 1 is shown as a solid material with small circular openings 16 formed therein, the top surface 4 may be constructed in part or all from a mesh material with openings 16 formed throughout defined by the mesh material.

Referring to FIG. 1, non-exclusive, illustrative dimensions of an exemplary apparatus 2 are as follows: inner diameter 10: 40 inches; length of attachment tab 14: 24 inches; diameter of exhaust openings 16: 1 inch; diameter of dust outlet 20: 4 inches; diameter of hose receptacle 18: 1.25 inches; height of shroud 22: 15 inches; height of downdraft space 12: 4 inches; approximate distance between exhaust openings 16: 4 inches. The enclosure 3 and shroud 22 may be constructed of thin wood, plywood, composites, polymer-based plastics, linoleum, vinyl, acrylic, sheet metal and/or combinations thereof. Where desired, the shroud 22 and/or enclosure 3 may further be constructed from translucent materials that allow ambient light to flow more freely for safer operation of the miter saw 30 by a user 28. A clear acrylic shroud 22 provides a greater sense of space in the work environment, as a user 28 may see through and beyond the shroud 22. Similarly, an acrylic enclosure 3 may provide a sense of satisfaction in the user in being able to see the dust and debris collected within the enclosure 3.

The component parts of the apparatus 2 may be secured together using wood glues, screws, or any other suitable or desired means of attachment. For example, the shroud 22 may be inserted within a narrow slot opening formed proximate the outer diameter 8 of the enclosure 3. Small support blocks (not shown) may be inserted within the downdraft space 12 to span the top and bottom surfaces 4/6 for additional support of the top surface 4. The blocks may be positioned at any suitable or desired locations, such as spaced along the outer circumference 8 so as not to interfere with the flow of dust particles and debris travelling through the downdraft space 12. While the above dimensions and materials for component parts of the apparatus 2 are suitable for most miter saws and work benches, it should be understood that any suitable or desired dimensions for the apparatus 2 and/or materials for constructing portions or all of the apparatus 2 may be utilized.

Referring again to FIG. 1, the attachment tab 14 is designed to overlap and connect with a work bench or other table supporting a miter saw (shown in FIG. 2). The tab 14 may be securely attached to a work bench or other table by any desired or suitable means, including without limitation, a series of angle brackets. Once secured to the work bench, the tab 14 retains the apparatus 2 in an overhang position behind the work bench or other table. The inner diameter 10 of the enclosure 3 is also retained against the side of a work bench providing additional lateral support for the apparatus 2. The tab width 15 shown in FIG. 1 is approximately 4 inches, but may be of any suitable or desired width 15 necessary to support the apparatus 2 depending on the weight and dimensions of the apparatus 2.

FIG. 2 shows a user 28 standing behind a work bench 42 with miter saw 30 in operation and dust collector apparatus 2 collecting dust particles 50 from multiple directions. As shown in FIG. 2, the apparatus 2 further comprises a length of flexible hose 44 for capturing dust and debris 50 flowing from the miter saw's 30 existing dust collection port 33 on the saw housing 32 covering the saw blade 34.

Referring to FIG. 2, a first end of the hose 44 is connected to the existing dust collection port 33 on the housing 32 for the miter saw 30. The hose 44 extends in a generally upward direction above the shroud 22 before curving downward inside the shroud 22. A second end of the hose 44 is attached to the hose receptacle opening 18 on the enclosure 3. As shown in FIG. 2, the flexible hose 44 carries dust and debris particles 50 from the top of the saw housing 32 directly to the downdraft space 12. The length and flexible nature of the hose 44 permit automatic adjustment of the hose 44 as needed when the saw 30 is moved to various axes and positions. The hose 44 further permits for endless collection of dust and debris 50; in particular, the hose 44 obviates a user 28 from having to periodically stop work and empty a typical dust collection apparatus, such as bag attached to the dust collection port 33, that quickly fills with dust and debris 50. Instead, the hose 44 carries the dust and debris 50 directly into the enclosure 3 and prevents any airborne contaminants from escaping the dust collection port 33.

Referring to FIG. 2, the apparatus 2 may further comprise a length of exhaust hose 48. The exhaust hose 48 may be attached to the enclosure 3 for continuous transportation of dust and debris 50 from the enclosure 3 to a dust extractor 51, such as a vacuum. As shown in FIG. 2, a first end of the hose 48 is shaped for attachment to the dust outlet 20. The dust outlet 20 may further comprise an exhaust flange 46 within the outlet opening 20. The flange 46 extends beneath the enclosure 3 and is shaped for slidable but firm insertion of the exhaust hose 48 around the flange's perimeter 46.

Referring to FIG. 2, in operation, the vacuum force 51 pulls on the dust and debris particles 50 collected by the apparatus 2 from multiple sources surrounding the miter saw 30. Dust and debris 50 formed by operation of the miter saw 30 ejected in a generally upward direction relative to the saw blade housing 32 are collected in the flexible hose 44, transported into the downdraft space 12, through the dust outlet 20, and to the vacuum 51. A plurality of debris particles 50 formed by operation of the miter saw 30 ejected in a generally downward direction relative to the housing 32 hit the top surface of the enclosure 3, are transported through the exhaust openings 16 (shown in FIG. 1) into the downdraft space 12, through the dust outlet 20, and to the vacuum 51. Finally, debris 50 formed by operation of the saw 30 ejected in a generally forward and side directions relative to the housing 32 contact the curved shroud 22, fall to the top surface of the enclosure 3, are transported through the exhaust openings 16 (shown in FIG. 1) into the downdraft space 12, through the dust outlet 20, and to the vacuum 51.

Referring to FIG. 2, as a result, a workspace surrounding the apparatus 2 is kept clear of a plurality of debris particles 50 formed by operation of a miter saw 30 and ejected in any and all directions—up, down, side, forward and at all angles there between.

FIG. 3 shows a top view of the apparatus 2 installed on a work bench 42 with a schematic representation of a miter saw 30 in two potential positions for a 90 degree cut. Referring to FIG. 3, the miter saw 30 is shown on its base 36 secured to the work bench 42. As shown in FIG. 3, approximately one-fourth of the saw base 36 for the miter saw 30 is positioned over the inner diameter 10 of the enclosure 3. The edges of the shroud 24/24' overlap the work bench 42 and are positioned flush against opposed fence barriers 40/40' on either side of the saw 30. An additional fence 41 for the saw 30 may be aligned with the opposing fence barriers 40/40' installed on the work bench 42. Both the miter handle 38 and the angle adjustment handle 54 are positioned for a 90 degree cutting angle.

Referring to FIG. 3, as the miter saw housing 32 and motor 52 are moved forward (away from the user) from a first position 56 to a second position 58 during a cut, the angle adjustment handle 54 moves to a forward position over the dust outlet 20 and proximate the hose receptacle 18. The shroud 22 encircles the cutting area and, in conjunction with the fence panels 40/40', provides a full 180 degree barrier around the cutting axis to catch and collect dust and debris. The travel length of the saw housing 32 generally corresponds to the radius of the shroud 22. An approximate eighteen inch radius permits sufficient travel movement for virtually all miter saw 30 designs.

FIG. 4 is a top view of the apparatus 2 installed on a work bench 42 with a schematic representation of a miter saw 30 in two potential positions for a 45 degree cut. Referring to FIG. 4, the miter saw 30 is shown on its base 36 secured to the work bench 42. The edges of the shroud 24/24' overlap the work bench 42 and are positioned flush against opposed fence barriers 40/40' on both sides of the saw 30. Both the miter handle 38 and the angle adjustment handle 54 are positioned for a 45 degree cutting angle.

Referring to FIG. 4, as the miter saw housing 32 and motor 52 are moved at an angle to the user from a first position 60 to a second position 62 during a cut, the angle adjustment handle 54 moves to a forward position proximate the outer circumference 8. The shroud 22 encircles the cutting area and, in conjunction with the fence panels 40/40', provides a full 180 degree barrier around the cutting axis to catch and collect dust and debris.

As shown in FIG. 4, the shroud 22 blocks and captures dust and debris 50 (shown in FIG. 2) regardless of the angle of cut and at all positions of the saw housing 32 as the saw 30 moves forward and backward during cutting action.

INDUSTRIAL APPLICABILITY

It is clear that the inventive Miter Saw Dust Collector Apparatus of this application has wide applicability to any industry and any location in which miter saws are utilized. The apparatus collects saw dust and debris ejected in all directions without blocking available light, and without requiring a user to periodically stop to empty collection bags. The system may be installed against any size or height work bench and is universal to virtually all types and designs of miter saws. The enclosure may be scaled to permit slidable movement of the saw housing regardless of blade size. The apparatus may be used with both sliding and stationary miter saws. The apparatus also may be sold as a kit with the enclosure and shroud capable of user assembly sold in conjunction with the desired hose sizes and lengths.

It should be understood that various modifications within the scope of this invention can be made by one of ordinary skill in the art without departing from the spirit thereof and without undue experimentation. For example, any suitable or desired materials may be used for the component parts disclosed in this application. As another example, the top and/or bottom surfaces 4/6 of the enclosure 3 may be curved or conical in shape. Alternate embodiments further include shrouds 22 of alternate shapes, such as tapered towards the edges 22/24'. Any suitable or desired vacuum system may be utilized in connection with the invention, including shop vacuums of various designs. This invention is therefore to be defined as broadly as the prior art will permit, and in view of the specification if need be, including a full range of current and future equivalents thereof.

I claim:

1. A miter saw dust collector apparatus comprising:
   a downdraft enclosure, said enclosure having a top surface, a bottom surface, a curved margin defining an outer circumference, a straight margin defining an inner diameter, said top and bottom surfaces and said curved and straight margins defining an internal downdraft space;
   an attachment tab extending laterally from the top surface of the enclosure proximate the inner diameter, said tab having a defined width;
   a plurality of spaced exhaust openings formed in the top surface;
   a hose receptacle opening formed in the top surface proximate the outer circumference;
   a length of flexible hose, an end of said hose capable of attachment to the hose receptacle opening on the top surface;
   a dust outlet opening formed in the bottom surface; and,
   a shroud panel extending vertically from the top surface at the outer circumference, said shroud having opposing edge margins overhanging the inner diameter of the enclosure by an overhang length generally consistent with the tab width.

2. The apparatus of claim 1, further comprising a length of exhaust hose, an end of said hose capable of attachment to the dust outlet proximate the platform bottom surface.

3. The apparatus of claim 1, wherein the dust outlet opening further comprises an exhaust flange, said flange shaped for slidable insertion within an exhaust hose extending beneath the bottom surface of the enclosure.

4. The apparatus of claim 1, further comprising an exhaust hose, wherein a first end of the exhaust hose is attached to the enclosure proximate the dust outlet opening, and a second end of the exhaust hose is attached to a dust extractor device, and wherein a vacuum force formed by the dust extractor device pulls on a plurality of debris particles, said force moving said particles generally from the top surface, through the downdraft space, through the dust outlet, through the exhaust hose and into the dust extractor.

5. The apparatus of claim 1, wherein the end of the hose is attached to the hose receptacle opening on the downdraft enclosure, and a second end of the hose is attached to a dust collection port formed on a miter saw housing.

6. The apparatus of claim 1, wherein a shape for the exhaust openings is selected from the group consisting of: circular, elliptical, square, rectangular, or rhomboid.

7. The apparatus of claim 1, wherein a shape for the hose receptacle opening is selected from the group consisting of: circular, elliptical, square, rectangular, or rhomboid.

8. The apparatus of claim 1, wherein a shape for the dust outlet opening is selected from the group consisting of: circular, elliptical, square, rectangular, or rhomboid.

9. The apparatus of claim 1, wherein at least a portion of the top surface is constructed from a mesh material.

10. The apparatus of claim 1, wherein the enclosure is constructed from a material selected from the group consisting of: wood, plywood, composites, polymer-based plastics, linoleum, vinyl, or acrylic.

11. The apparatus of claim 1, wherein the shroud panel is constructed from a material selected from the group consisting of: wood, plywood, composites, polymer-based plastics, linoleum, vinyl, acrylic, or sheet metal.

12. The apparatus of claim 1, wherein at least a portion of the shroud is translucent.

13. The apparatus of claim 1, wherein at least a portion of the enclosure is translucent.

14. The apparatus of claim 1, wherein the width of the tab is overlapped with, and securely attached to, a top surface of a work bench.

15. The apparatus of claim 1, wherein the edge margins of the shroud are in flush contact with a pair of spaced, opposing generally planar fence guards mounted on a work bench.

16. The apparatus of claim 1, wherein at least a portion of a saw base for a miter saw is positioned over the inner diameter of the downdraft enclosure.

17. The apparatus of claim 1, wherein a plurality of debris particles formed by operation of a miter saw ejected in a generally upward direction relative to a saw blade housing for the saw are collected in the flexible hose, transported into the downdraft space, through the dust outlet, and to a dust extractor.

18. The apparatus of claim 1, wherein a plurality of debris particles formed by operation of a miter saw ejected in a generally downward direction relative to a saw blade housing for the saw are collected on the top surface of the enclosure, and are transported through the exhaust openings into the downdraft space, through the dust outlet, and to a dust extractor.

19. The apparatus of claim 1, wherein a plurality of debris particles formed by operation of a miter saw ejected in a generally forward direction relative to a saw blade housing for the saw contact the shroud, fall to the top surface of the enclosure, are transported through the exhaust openings into the downdraft space, through the dust outlet, and to a dust extractor.

20. The apparatus of claim 1, wherein a workspace surrounding the apparatus is continuously kept clear of a plurality of debris particles formed by operation of a miter saw positioned proximate the inner diameter of the apparatus.

* * * * *